United States Patent [19]

Bekkadal et al.

[11] Patent Number: 4,661,817
[45] Date of Patent: Apr. 28, 1987

[54] METHOD AND APPARATUS FOR MEASURING THE DISTANCE TO AN OBJECT

[75] Inventors: Fritz Bekkadal, Tiller; Tor Schoug-Pettersen, Trondheim, both of Norway

[73] Assignee: 501 Autronica A/S, Trondheim, Norway

[21] Appl. No.: 668,372

[22] PCT Filed: Apr. 5, 1984

[86] PCT No.: PCT/NO84/00019
 § 371 Date: Oct. 3, 1984
 § 102(e) Date: Oct. 3, 1984

[87] PCT Pub. No.: WO84/03942
 PCT Pub. Date: Oct. 11, 1984

[30] Foreign Application Priority Data
 Apr. 5, 1983 [NO] Norway .................... 831198

[51] Int. Cl.⁴ .................. G01S 13/08; G01F 23/28
[52] U.S. Cl. .................... 342/124; 73/290 R
[58] Field of Search .......... 343/5 FT, 5 SA, 12 R, 343/14; 367/90 B; 73/290 R

[56] References Cited

U.S. PATENT DOCUMENTS 3,807,231 4/1974 Spaw ...................... 73/290 R
4,234,882 11/1980 Thompson ................ 343/14
4,458,530 7/1984 Bastida .................... 343/177 X Primary Examiner—T. M. Tubbesing
Assistant Examiner—Gilberto Barrón, Jr.
Attorney, Agent, or Firm—James E. Pittenger

[57] ABSTRACT

A method and device for measuring the distance to an object, particularly the distance to the surface (17) of a liquid in a container (15). An antenna (11) is arranged a distance from and aimed against the surface, the antenna being connected to a measuring unit (12), a channel unit (13) and a control unit (14). A microwave signal with a predetermined frequency is generated in the measuring unit (12), of which a part is utilized as a reference signal, while a further part is input to the antenna (11) and transmitted against the surface (17). From the reflected signal received by the antenna and supplied to the measuring unit (12) and the reference signal, a function of the antenna input reflection coefficient is determined. This function is adapted to the current condition. A fourier transformation of a set of values of this function at a certain set of measuring frequencies is made, from which the distance to the surface is calculated.

16 Claims, 6 Drawing Figures

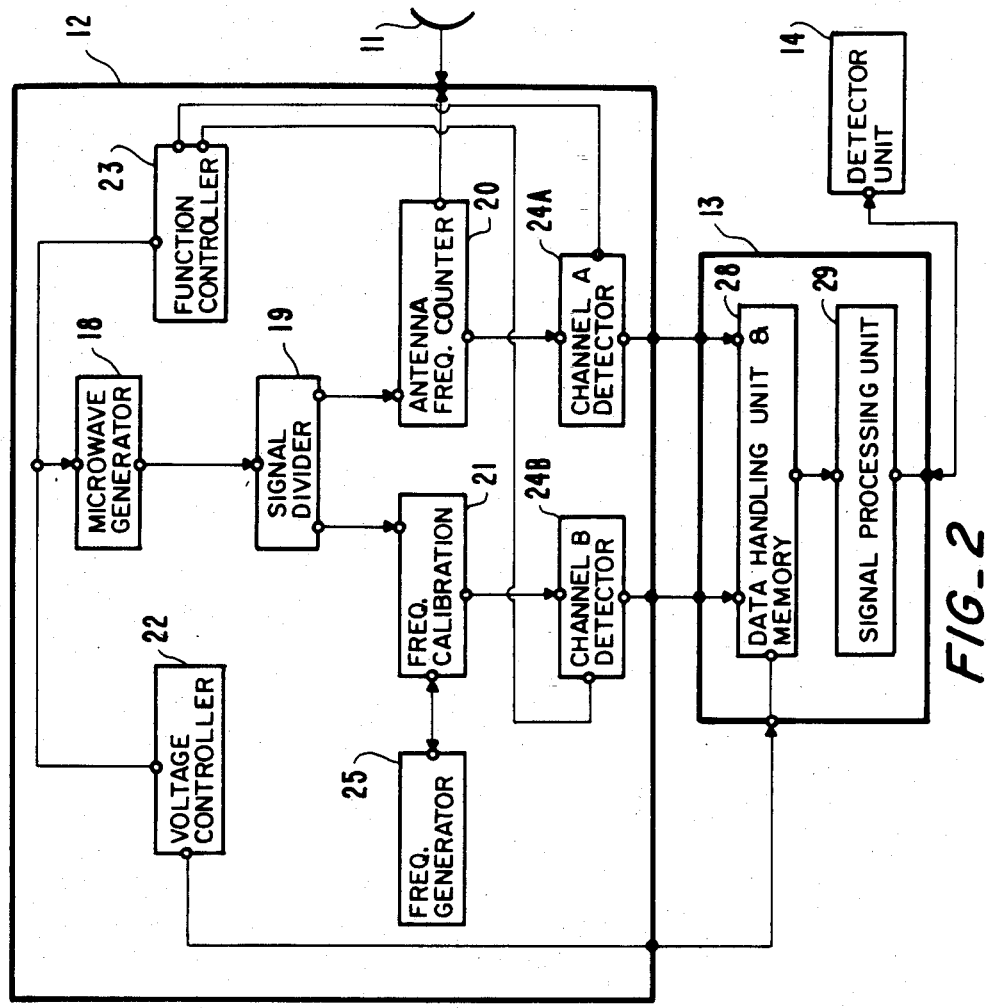
FIG_2
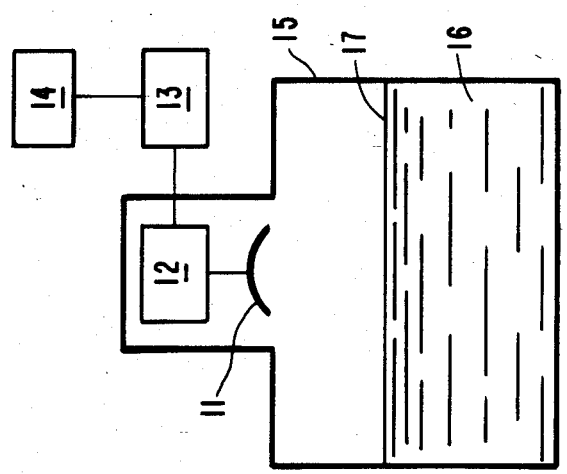
FIG_1

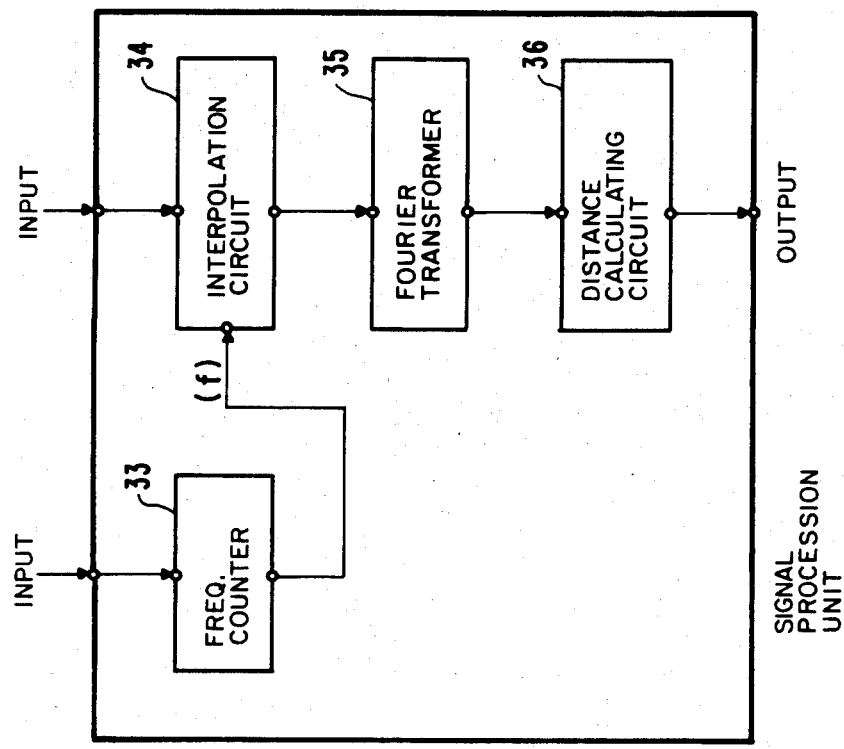
FIG_6
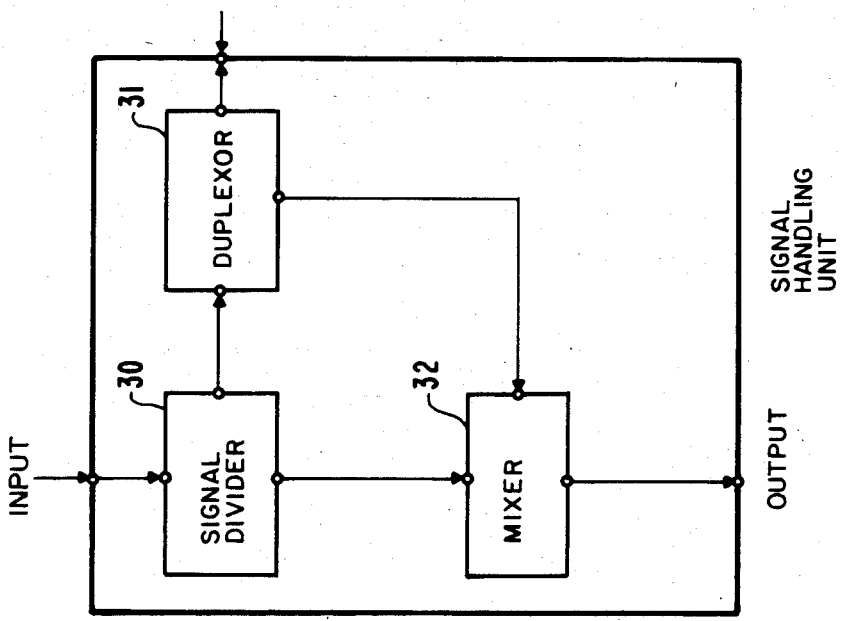
FIG_5

METHOD AND APPARATUS FOR MEASURING THE DISTANCE TO AN OBJECT

The invention relates to a method to determine the distance to an object, particularly the level of a liquid or another flowable medium in an enclosure or container.

Further the invention relates to a device for determination of such distance and level.

The terminology used in this specification relating to microwave technology is according to the definitions in IEC Standard, Publication 615: "Terminology for microwave apparatus", Geneve, Switzerlaand, 1976.

For the purpose stated above different methods based on radiation of electromagnetic waves are used.

The signal is transmitted as short pulses. The received signal consists of a series of pulses corresponding to echos from objects at different distances. The signal handling consists of a time and amplitude determination of the echo pulses which requires very fast acting circuits. The resolution will increase with decresed pulse length. A new pulse can not be transmitted before all significant echos are returned. If the period between transmission of pulses is T, the ratio of peak gain to average gain for the radar transmitter will be $T/\tau$. To avoid distortion of the pulses, the radar should have a band width of $\sim 1/\tau$.

Chirp radar

This kind of radar differs from the pulse radar only in the generation and detection of pulses. The transmitted signal has a longer duration, but is frequency modulated, changing the frequency from the lowest to the highest or vice versa, of the pulse range. In the receiver the signal is passed to a matched filter delaying the low frequencies relatively to the high and compressing the signal to a pulse of the same length as in a pulse radar with the same requirement for solution. After the compressing, the handling of the signal is alike for the two systems. The chirp radar requires lower peak effect than the pulse radar, but a matched filter.

FM-radar

In this type of radar the transmitted signal has a constant amplitude. It is frequency modulated linearly and periodically from the lowest to the highest frequency in the band or vice versa, similarly to the chirp radar, but the frequency scanning can be more time consuming. A part of the transmitted signal is branched off and utilized as a local oscillator signal for a receiving mixer circuit, mixing it with the reflected signal. Due to the time difference of the reflected signal, a difference frequency proportional to the distance to the reflecting object is developed. Different parts of reflection show up as particular frequency components in the received signal, which can be filtered out.

Analysis of the received signal is carried out in a filter assembly or one or more tunable filters. The receiver can be designed with a low bandwidth, demanding a short scanning time to work with a mixing frequency in the low noise area of the receiver.

Reflectometer

By this method the reflection coefficient $\rho = re^{j\phi}$ for the antenna over the desired frequency range is measured. Here r is the module of the reflection coefficient (amplitude) and $\phi$ its phase, while e is the base of the natural logarithm and $j=\sqrt{-1}$. The reflection coefficient $\rho(f)$, where f is the measuring frequency, is measured for a series of discret frequencies evenly distributed over the frequency range. The data measured are fed to a micro processor or another data processor effecting a fourier transformation of $\rho(f)$ from the frequency plane to the time plane. The result is a time function corresponding to the reflected signal of a pulse radar system. Systems based on this method may thus be called synthezied pulse radar systems. The signal will however not be present in true time, but in data form, which will bring great advantages for the further signal analysis.

The present invention utilizes the principle described above combined with a series of particular methods of signal generation and handling which will make the level measurement more accurate and flexible than existing methods and give other advantages to be described below.

Systems based on the reflectometer method can not operate in true time, as indicated above. It is then appropriate to use digital signal handling, which will give the system some characterizing features. A discret fourier transformatio (DFT) has to be carried out, preferably with equidistant frequencies when using fast DFT-algorithms, such as "Fast Fourier Transform" (FFT). If the distance between the frequencies in this equidistant set is $\Delta f$, the time representation of the reflection coefficient $\rho(f)$ through a discrete fourier transformation will be periodical with $T = 1/\Delta f$. Two contributions to $\rho(f)$ with time delays $\tau_1$ and $\tau_2$ will be shown at the same location in the time representation if $\tau_2 \tau_1 = nT$, wherein n is a number (n=0, 1, 2, ...). It is thus necessary first to choose T sufficiently high that the largest value of the time delay $\tau$ which may occur within the current measuring range, $\tau_{max}$, is less than T. Additionally T should be choosen so high that no contributions which are able to disturb the measurment have time delays larger than T.

A simplification of the system can be achieved by measuring only the real part, $Re\{\rho(f)\}$, or only the imaginary part $Im\{\rho(f)\}$, of the complex reflection coefficient $\rho(f)$. If the phase of the reference signal, the signal for comparing the reflected signal from the antenna, is assumed 0, a reflected signal with time delay $\tau$ will give a contribution to $\rho(f)$ which is proportional to $e^{-j2\pi f\tau}$. The real part of this contribution is $Re\{e^{-j2\pi f\tau}\} = \cos(2\pi f\tau) = \frac{1}{2}[e^{j2\pi f\tau} + e^{-j2\pi f\tau}[$ which will give contributions of equal length at time delays $\tau$ and $-\tau$. Due to the said periodicity of the discrete fourier transformation, the contribution with the time delay $-\tau$ also can be shown with the time delay $T - \tau$. This means that when only the real part or the imaginary part of $\rho(f)$ is measured, T has to be choosen large enough to give a time delay $\tau$ within the range of measurement, $\tau_{max}$ which is less than $T/2$.

A disadvantage of measuring the distance to an object by using a separate antenna is the substantial decrease in the reflected signal with increased distance to the object. For an even surface, which is a possible case, the amplitude of the reflected signal is inversely proportional to the distance from the antenna, provided that the distance exceeds a certain threshold, while the echo-amplitude for an object with a small angular dimension is inversely proportional with the squared distance. This is the case when the medium between the antenna and the object is free of loss relative to the electromagnetic wave propagation. If the electromagnetic waves are substantially attenuated due to the properties of said medium, the amplitude of the received signal will decrease more with the distance than stated above. The problems related to digital signal handling develop particularly when the desired signal is only a minor part of the total signal. A better solution is then needed, i.e. a large number of units in the digital representation of the signal.

A remarkable progress is achieved by the present invention by, instead of using values of the reflection coefficient of the antenna directly in the fourier transformation, using a function of the reflection coefficient which is adapted to the actual measuring task and the actual object to be measured, and then to fourier transform this function.

When measuring against an even surface through a medium with a low attenuation, the optimal function is the derivative of the reflection coefficient $\rho(f)$ to frequency, $\rho'(f) = d\rho(f)/df$, which the following calculation will show.

If $F(x)$ is the fourier transformation of $x$ and $$F\{\rho(f)\} = R(\rho) \qquad (1),$$

$$\text{then } 1/2\pi j \, F\{\rho'(f)\} = \tau \cdot R(\tau). \qquad (2)$$

This shows that by using the derivative of $\rho(f)$, the contribution from larger distance will be emphasized relative to the contribution from less distance and propotional to this distance. The reflection from a large, even surface will then be independent of the distance from the antenna.

In this case, $\rho'(f)$ will not be measured, but the differential coefficient of reflection $\Delta\rho(f)$, which is found by measuring $\rho(f)$ over an increment $f_d$ and subtracting the values:

$$\Delta\rho(f) = \rho\left(f + \frac{f_d}{2}\right) - \rho\left(f - \frac{f_d}{2}\right) \qquad (3)$$

This should be carried out on an analogous base, to achieve the reduction in digital solution mentioned above.

To measure the differential coefficient of reflection or its real or imaginary part, the following method can be used:

The microwave signal on the input of the antenna changes between two frequencies in a distance $\delta f$, $f_1 = f - \delta f$ and $f_2 = f + \delta f$, wherein f is the measuring frequency. The signal reflected from the antenna terminal is fed to a detection circuit with an output voltage V proportional to e.g. Re$\{\rho\}$. When the frequency varies between $f_1$ and $f_2$, V will vary between $V_1 \sim \text{Re}\{\rho(f_1)\}$ and $V_2 \sim \text{Re}\{\rho(f_2)\}$. The voltage $\Delta V = V_2 - V_1$ is then a measure for Re$\{(\rho(f_2)\} - \text{Re}\{\rho(f_1)\}$. Similarly a higher differential can be formed by changing the frequency between n values $f_1, f_2, \ldots, f_n$ and selecting a suitable linear combination of the corresponding detector voltages $V_1, V_2, \ldots, V_n$.

To achieve high accuracy in the measurement according to the present invention, it is necessary to know the frequencies at which the values of the function of the antenna input coefficient of reflection are determined. This can in principle be carried out by synthezicing the measurement frequencies or by using a frequency counter with sufficient accuracy. This method will however be expensive and time consuming and the following method is preferred according to the present invention:

The microwave signal is generated by a voltage controlled oscillator (VCO), and the control voltage varies to increase or decrease the frequency substantially linearly with time. The measurements may then suitably be carried out at identical intervals. The signal is branched, one part being used as the reference impedance for measuring an impedance element which is a known function of the frequency. The measurement of the reference impedance is made at the same microwave signal frequency that is used to measure the antenna.

The coefficient of reflection ($f_k$) of the reference impedance $\rho_r$ at the frequency of measurement k, $f_k$ is $\rho_{rk}$, $f_k$ is determined by solving the equation:

$$\rho_{rk}\rho_r(f_k) \qquad (4)$$

wherein $\rho_r(f)$ is the known frequency measurement of $\rho_r$. The frequency f should then in principle be a function of $\rho_r$ over the total measurement frequency range. If it is known that $f_k$ will be between two frequencies $f_a$ and $f_b$, the distance between which is less than the total range of measurement frequencies, it is sufficient that f is a function of $\rho_r$ in the frequency range $f_a$ to $f_b$.

This method will normally not incure equidistant measurement frequencies and suitable routines for making interpolations are used, as described above, in an FFT-algorithm, when equidistant sets of measurement frequencies are desirable. In the preceeding, it is assumed that the object, on which the measurement is made, is stationary. If the object is moving, which is the case with the suface of a liquid in a container being filled or emptied, measurement errors can occur.

It is provided that the measurement is carried out in a frequency range $(f_o - \Delta F/2, f_o + \Delta F/2)$, which is a range having a width $\Delta F$ around the center frequency $f_o$, and the duration of the measurement is $T_o$. If the distance to be measured changes from $h_1$ to $h_2$ during the measurement period $T_o$, the phase of the coefficient of reflection is changed from $\phi_1 = 4\pi(f_o - \Delta F/2)h_1/c$ to $\phi_2 = 4\pi(f_o + \Delta F/2)h_2/c$ (wherein c is the velocity of light in the medium between the antenna and the object), pro- vided that the measurements occur at increasing frequencies.

The phase change will then be:

$$\Delta\phi = \phi_2 - \phi_1 = 2\pi\Delta F \frac{h_1 + h_2}{c} + 4\pi f_o \frac{h_2 - h_1}{c} \qquad (5)$$

This should be compared to the phase change for a resting object in the distance h, which will be $4\pi\Delta F$ h/c by making $h_1 = h_2 = h$ in the above equation. The apparent distance to the moving object will then be:

$$h = \frac{h_1 + h_2}{2} + \frac{f_o}{\Delta F}(h_2 - h_1) \qquad (6)$$

$$= h_m + \frac{f_o}{\Delta F}(h_2 - h_1)$$

In this equation the average distance $h_m = h_1 + h_2/2$ is the obvious definition of the distance to a moving object, with the expression $(f_o/\Delta F)(h_2 - h_1)$ added.

If $f_o/\Delta F$ is equal to 10, a probable value, an error of measurement is created, which is 10 times the distance moved by the object during the time of measurement. This error can be eliminated by additionally making a measurement with the frequency decreasing from $f_o + \Delta F/2$ to $f_o - \Delta F/2$ during the time of measuring $T_o$.

If the object is moving with an even rate, the last measurement will give an error with the same absolute value as the first, but with opposite sign. By averaging the two measurements, a distance is determined which corresponds to the distance in the middle of the total period of measurement.

The objection of the invention is achieved by carrying out the method as described above. Further features of the invention, including a device for carrying out the method, are described later in this specification.

The invention will be described in more detail with reference to the accompanying drawings, which show embodiments of the invention.

FIG. 1 shows diagrammatically the structure of a device for measuring the level in a container according to the present invention FIGS. 2-4 show block diagrams for various embodiments of the measurement device in FIG. 1;

FIG. 5 is a block diagram for the channel detector unit; and

FIG. 6 is a block diagram for the signal processing unit shown in FIGS. 2-4.

Figure 3:
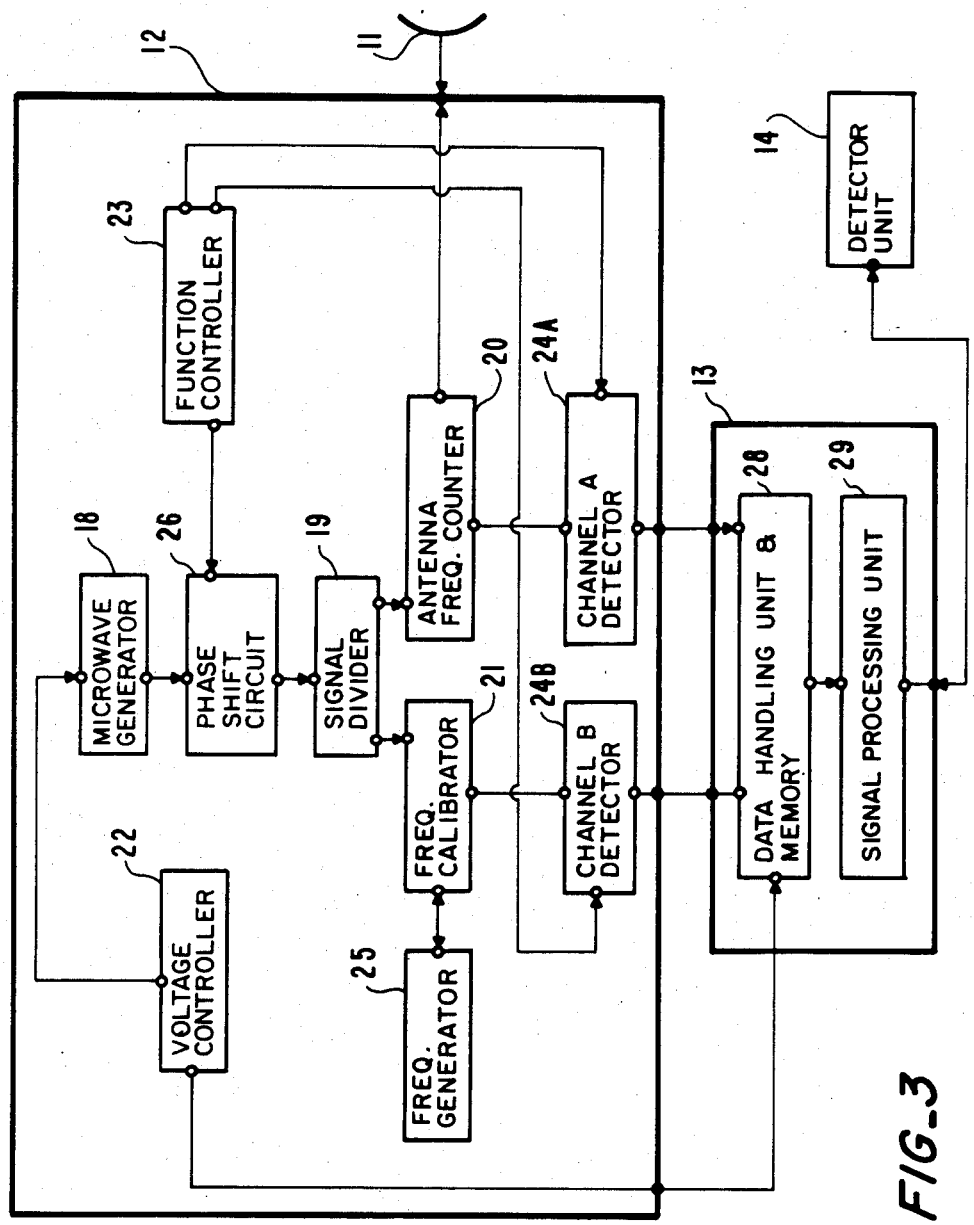

The device shown in FIG. 1 comprises an antenna 11, a measurement unit 12, a channel unit 13 and a detector unit 14, which will all be further described below. In the case where the object to be measured is the level 17 of the liquid 16 in a container 15, the antenna is arranged at the top of the container as shown.

In the measurement unit 12 a microwave signal is generated by a microwave generator 18, which may be a voltage controlled oscillator, and is branched in a divider 19 between an antenna measurement unit 20 in a channel A and a frequency calibration unit 21 in channel B which is connected to a controlled frequency generator 25. The control voltage for the microwave generator 18 is provided from a control unit 22 for measurement frequency, which ensures that the signal is within a set of nominal measuring frequencies. To develop the set of frequencies around each measuring frequency, which is needed to creat the described function of the antenna reflection coefficient, the control voltage is superimposed on an additonal voltage from a function control unit 23. This combined voltage is also fed to detection units 24A and 24B, to give the contribution from each frequency the desirable weight factor.

The circuitry of FIG. 3 differs from that of FIG. 2 in the development of the set of frequencies around each measurement frequency. In a controlled phase shift circuit 26 the phase of the microwave signal is increased by $\psi$ during an interval T. The frequency of the microwave signal will then increase with $\Delta f = \psi/T$. By varying $\psi$ and/or T the frequency increase can be determined and the desirable set of frequencies generated. However it is not necessary to increase the phase linearly to the time in the interval T, as the phase may be increased in one or more steps by the use of multiple phase modulator.

Figure 4:
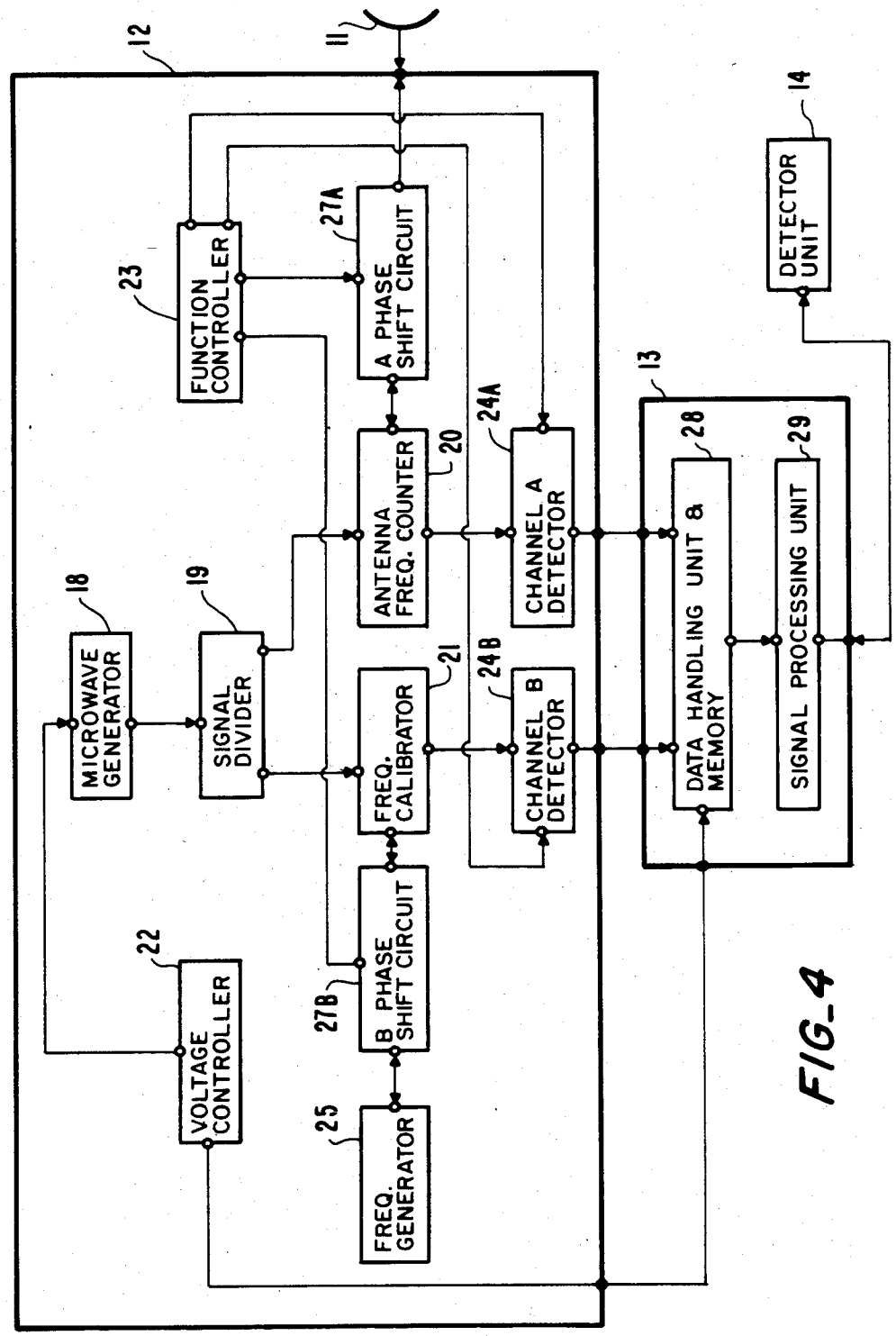

The circuitry of FIG. 4 differs from that of FIG. 3 by using two controlled phase shift units 27A and 27B handling only the signals to the antenna, respectively the reference impedance. It will then be possible to use different functions as described for the shown A and B channel.

The antenna frequency measurement unit 20 and the frequency calibrating unit 21 may be embodied as reflectometers as described above. In FIG. 5 is shown a block diagram for a embodiment of an reflectometer. The microwave signal from the divider 19 is fed to a second divider 30. A part of the signal is used as a reference signal in a mixer 32, while another part is input to a duplexing circuit 31. From the duplexing circuit 31 the signal is transmitted to the impedance to be measured, the reflected signal is transferred from the duplexing unit 31 to the mixer 32, wherein it is mixed with the reference input signal, producing a low frequency output signal fed to the detection unit 24 (24A and 24B).

The detected signals in channel A (from the antenna measuring units 20), and in channel B (from the frequency calibrating unit 21) are converted from analog to digital in unit 13 and stored in a data storage or register in a data handling unit 28, to present the measured results from the two channels for further handling in a signal processing unit 29.

A block diagram showing the main functions of the signal processing unit 29 is shown in FIG. 6. These will be further described below.

From the data handling unit 31 values of the described function of the reflection coefficient for the antenna at a finite number of discret frequencies within a certain range of frequencies are present in channel A and values of the described function of the reflection coefficient for the reference impedance at the same or some of the same measuring frequencies are present in channel B.

From data from channel B the measuring frequency (f) is determined by a frequency counter unit 33. These frequencies are used in an interpolation circuit 34 to find values of the described function for channel A at a given set of frequencies which is compatable to the later signal handling, in the case this set of frequencies and the measuring frequencies are not identical. These function values are then fourier transformed, followed by a division of the contribution from the object and the distance calculations are carried out in a circuit 36, using calculating routines corresponding to the signal and previously established data regarding the measuring path.

The described measurements and calculations are carried out for two sequences rapidly succeeding, one for increasing frequencies and the other for decreasing, to eliminate errors due to an even change in the distance of the object during the interval of measurement by averaging in the calculating unit 36.

From the calculating unit 36 in the signal processing unit 29 data are available for a calibrated distance from a predetermined reference point close to the antenna to the object to be measured.

In the detector unit 14 the different other units and circuits are monitored and controlled, parallel to the development of other user data from distance input data from the signal processing unit in the described channel unit 13, as well as from tables of data, other calculating units, sensors etc.

The detector unit 14 may normally be used for several of the described channel units by using a cyclical operating multiplexing circuit between the channel units and the detector unit to make a selection in intervals between channel units connected in parallel to the mulitplexing circuit.

Correspondingly the channel unit 13 can be used for several measuring units with a multiplexing circuit between the measuring units and the channel unit, or the signal processing unit 29 of the channel unit can be used for several data processing units connected to a measuring unit each, by connecting a multiplexing circuit between the data handling units and the signal handling unit.

We claim:

1. A method for measuring the distance to an object, such as the surface of a liquid or another flowable medium in a container or similar environment, wherein a microwave signal with a predetermined frequency is generated, a part of the the signal is used as a reference signal while a second part is fed to an antenna which is directed against said surface whereby the surface and other present objects influence the input impedance of the antenna and the corresponding unit reflection coefficient through their distant dependent contributions to said reflection coefficient, characterized in making a measurement function of the input reflection coefficient of the antennaa at a combination of values of the reflection coefficient at at least two frequencies in an interval around a nominal measuring frequency in a manner to emphasize contributions to said function from objects in certain distances relatively to contributions from objects in other distances, calculating by fourier transformation a set of values of this function at the predetermined set of measuring frequencies, the different object's contribution to the fourier transformed function are separated according to their different distance from the antenna while contributions from fixed objects are eliminated since their contributions to the fourier transformed function are known, and the contributions of the surface is divided out due to its strength and/or position to enable the determination of the distance to the surface.

2. A method according to claim 1, characterized in that the said measurement function for measuring the level of a surface is formed by the differential of the input reflection coefficient of the antenna said differential being defined as the difference between the values of the reflection coefficient at two adjacent frequencies in an interval around the nominal measuring frequency.

3. A method according to claim 1, characterized in that the said measurement function for measuring the distance to an object when the object has a restricted angular dimension relative to the transmitted signals of the antenna is formed as the second order differential of the input reflection coefficient of the antenna this second order differential being defined as the second derivative to the frequency of the reflection coefficient at three adjoining frequencies at an interval around the nominal measuring frequency.

4. A method according to claim 1, characterized in that the said measurement function for measuring the distance to an object when the object is surrounded by a medium in which the electromagnetic waves are substantially attenuated with increasing distance is formed by a combination of different order differentials of the input reflection coefficient of the antenna whereby the general n th order differential is defined as the n th order derivative of th antenna input reflection coefficient at $n+1$ adjoining frequencies in an interval around the nominal measuring frequencies.

5. A method according to claim 1, characterized in that the values of the measurement fuction are determined for a defined number of discrete measuring frequencies within a restricted frequency range, and a fourier transformation of the values of the function is then made, the number of measuring frequencies and the average distance is selected to achieve a predetermined accuracy.

6. A method according to claim 1, wherein the measuring frequencies at which the measurement function of the input reflection coefficient of the antenna is determined, are characterized in that the measuring frequencies are selected sufficiently close to allow calculation of the measurement function values at the intermediate frequencies by determining values of the dependent and reference impedance for the measurement function for the selected frequency, and the measuring frequencies are determined from measurements of the reference impedance, and then values of the measurement function of the input reflection coefficient are calculated at another set of frequencies.

7. A method according to claim 1, characterized in tha the measuring sequence to provide values of the measurement function is carried out twice with a short interval inbetween, the first time with an increasing measuring frequency and the second with a decreasing frequency, in order to eliminate errors due to a constant change in the distance to the object during the measurement.

8. A method according to claim 1, characterized in that the values of the reflection coefficient used to determine the measurement function are determined by letting a frequency component of the signal fed to the antenna take a series of frequency values in an interval around the nominal measuring frequency, and the detector circuits used to determine the function values are syncronized with the transmitted signal and adapted to cause a weighting of the reflection coefficient values to determine the measurement function after detection.

9. A method according to claim 1, characterized in that the values of the reflection coefficient used to form the measurement function are determined by combining the microwave signal fed to the antenna at at least two frequencies, and the frequency components are made to take a series of values in an interval around the nominal measuring frequency, the detector circuits used to form the measurement function values are syncronized with the frequency components of the transmitted signal and adapted to cause a weighting of the reflection coefficient values to determine the measurement function after detection.

10. A distance measuring device comprising an antenna arranged at a distance from and aimed against a surface, the distance to which is to be determined said device comprising a measuring unit including a frequency controlled microwave generator, a control unit for the controlling frequency, a function controlling unit and one or more detector units to determine the measurement function of the input reflection coefficient of the antenna at a number of discrete measuring frequencies within a specified frequency range, and a signal handling unit including means for making a discrete fourier transformation of the measuring function, processing the data provided and calculating the distance to the surface.

11. The device according to claim 10, characterized in that the units for forming the measurement function include one or more controlled phase shift circuits.

12. The device according to claim 10, characterized in that the measuring unit further includes a signal divider for dividing the signal from the microwave generator between an antenna measuring unit and a frequency calibrating unit which are each connected to separate detection units which in turn are both connected to a data handling unit for transforming the signals detected from the antenna measuring unit and from the frequency calibrating unit into digital form and to supply these signals to the signal processing unit.

13. The device according to claim 12, characterized in that the circuitry for forming the measurement function of the reflection coefficient comprises means to change either the amplitude, frequency or phase of the microwave signal and detector circuits syncin response to the microwave signal supplied to the antenna and the resulting reference impedance.

14. The device according to claim 12, characterized in that the antenna measuring unit and the frequency calibrating unit each include a reflectometer, and the antenna measuring unit further includes a duplex circuit connected to the antenna and the frequency calibrating unit further includes a duplex circuit connected to a frequency dependent reference impedance element.

15. A method according to claim 1, characterized in that the said measurement function for measuring the distance to an object when the object has a restricted angular dimension relative to the transmitted signals of the antenna is formed as the second order differential of the input reflection coefficient of the antenna, this second order differential being defined as a corresponding linear combination of the values of the reflection coefficient at three adjoining frequencies in an interval around the nominal measuring frequency.

16. A method according to claim 1, characterized in that said measurement function for measuring the distance to an object when the object is surrounded by a medium in which the electromagnetic waves are substantially attenuated with increasing distance is formed by a combination of different order differentials of the input reflection coefficient of the antenna whereby the general n th order differential is defined as a corresponding linear combination of the values of the reflection coefficient at $n+1$ adjoining frequencies in an interval around the nominal measuring frequencies.

* * * * *